United States Patent
Farrand

[15] 3,668,042
[45] June 6, 1972

[54] PROCESS FOR PRODUCING MAGNETIC TRANSDUCER WITH NARROW SENSING TIP

[72] Inventor: William A. Farrand, Fullerton, Calif.
[73] Assignee: North American Rockwell Corporation
[22] Filed: July 14, 1969
[21] Appl. No.: 851,534

Related U.S. Application Data

[62] Division of Ser. No. 623,385, Mar. 15, 1967, abandoned.

[52] U.S. Cl.................156/309, 29/472.9, 29/603, 179/100.2 C
[51] Int. Cl.................C09j 5/00
[58] Field of Search..........156/309, 322; 29/472.9, 603; 179/100.2 C

[56] References Cited

UNITED STATES PATENTS

| | | | |
|---|---|---|---|
| 3,026,379 | 3/1962 | Carpenter | 29/603 |
| 3,139,680 | 7/1964 | Scuro | 29/472.9 |
| 3,246,384 | 4/1966 | Vice | 179/100.2 X |
| 3,079,470 | 2/1963 | Camras | 179/100.2 |

OTHER PUBLICATIONS

Garrett et al. Broad Applications of Diffusion Bonding, NASA Contractor Report 409, Mar. 1966, p. VIII.

Primary Examiner—Carl D. Quarforth
Assistant Examiner—R. L. Tate
Attorney—William R. Lane, L. Lee Humphries and Robert G. Rogers

[57] ABSTRACT

A process for producing magnetic transducer comprising a relatively thin portion forming a sensing tip connected to a relatively thicker core portion including conductors wound around the core portion. The thin portion is separated in the region of its tip by a narrow gap filled with a material for forming a magnetic flux insulator.

1 Claims, 4 Drawing Figures

PATENTED JUN 6 1972 3,668,042

*INVENTOR.*
WILLIAM A. FARRAND

BY Robert G. Rogers

ATTORNEY 3,668,042

PROCESS FOR PRODUCING MAGNETIC TRANSDUCER WITH NARROW SENSING TIP

This is a division of application Ser. No. 623,385, now abandoned, for A Magnetic Transducer with Narrow Sensing Tip.

BACKGROUND OF THE INVENTION

1. Field of the Invention

The invention relates to a magnetic transducer and, more particularly, to such a transducer having a relatively narrow sensing tip formed by individual thin elements connected over a relatively large area to a relatively thicker core element and separated in the region of their tips by a narrow (recording) gap comprising means forming a magnetic flux insulator.

2. Description of Prior Art

Applicant is unaware of any magnetic transducer which anticipates the embodiments described herein, although various transducers are provided in order to meet the requirements of the present audio, video and data recording art. However, as the requirements for recording density increase, conventional transducer structures become difficult to fabricate and use.

For example, as the requirement for increasing the density of tracks of recorded information increases, the recording tip must be made narrower. However, as the thickness of the transducers is reduced, the structural strength is also reduced. The transducers become fragile and difficult to wind with conductors. This difficulty is aggravated for the common configuration in which "toroidal winding" is required. For large seals (multi-transducer) systems, uniformity of transducer performance can be of paramount importance. In order to use a narrow pole tip without materially affecting transducer uniformity, it is essential to have accurate control of pole face reluctance. Numerically small errors in dimension on a small pole face can produce large percentile changes in reluctance. In addition to winding problems, fragile transducers are more difficult to affix to transducer supports. On the other hand, if the tip portion is made larger, track density is decreased. A compromise design is usually selected which provides a transducer capable of being properly wound and connected to a transducer support. In such design, however, the recording density is relatively low.

A transducer is desired in which the recording tip can be made relatively narrow to increase the recording track density but in which structural strength of the elements requiring winding is independent of the desired tip width and wherein the mounting problems are simplified.

SUMMARY OF THE INVENTION

Briefly, the invention comprises a relatively thick magnetic core member on which windings may be placed for inducing or for sensing magnetic flux in the core. The core comprises electrically insulated and adjacent members which are interconnected at one end. One simple configuration for this element is a "horseshoe" shaped integral part which can be described as being the equivalent of three attached parallelepipeds such that the cross-sectional area of each leg is approximately square and equal. However, the precise shape may be adapted to the needs of a particular application.

A relatively thin magnetic portion (the pole pieces) is attached to the core member to carry magnetic flux from the core to a recording gap in a thin portion adjacent to the recording surface. The surfaces where the thin portion is attached to the core portion are relatively large and have a relatively small gap separation between the core and thin portion. The large area, small gap joints between the core and the thin portion, have relatively low reluctance. Therefore, this structure forms a magnetic flux path which is of low reluctance except for the recording or transducing gap. Either term may be used interchangeably in the subsequent description.

The general profile shape of the thin pole piece element may be made in any of the forms conventionally used for producing such pole pieces in the prior art. The recording gap may be formed with a material such as glass which has relatively little influence on the magnetic reluctance of the gap, or it may be filled with a high conductivity material such as a metal to produce an eddy current shim. Such a shim behaves like a magnetic flux insulator during changes in flux. In either case an induced flux in passing across the recording gap spread out (fringes) into the adjacent recording medium and can, therefore, be used to modify the state of magnetization of said medium. Similarly, when a magnetic pattern previously recorded on the medium is passed rapidly by the pole tip, some of the flux surrounding the magnetic pattern end picked up in the pole tips, follows the path through the pole tips and core instead of across the magnetic gap and, therefore, induces current in the core windings. When the rapidity of flux change is sufficiently high, an eddy current shim improves the efficiency of both operations.

In one embodiment the thin portion is attached at right angles to arm members of the core. The structure is attached to a transducer support so that the tip of the transducer is disposed adjacent to the recording surface for normal operations.

Therefore, it is an object of this invention to provide an improved magnetic transducer.

A still further object of this invention is to provide a magnetic transducer having a relatively thick core and relatively thin recording tip.

Still another object of this invention is to provide a magnetic transducer having improved structural rigidity.

A still further object of this invention is to provide a magnetic transducer more easily attached to transducer supports.

Another object of this invention is to provide a magnetic transducer having a thin sensing tip for increasing recording density.

Another object of this invention is to provide a magnetic transducer which may be more easily wound than prior art devices.

A still further object of this invention is to provide a transducer in which precision control of recording gap geometry and resultant reluctance is readily attained.

A still further object of this invention is to provide a transducer comprising thin and thick portions in which the thin portion has a recording gap filled with a material for producing a magnetic flux insulator including the process for producing the gap.

DESCRIPTION OF PREFERRED EMBODIMENTS

Figure 1:
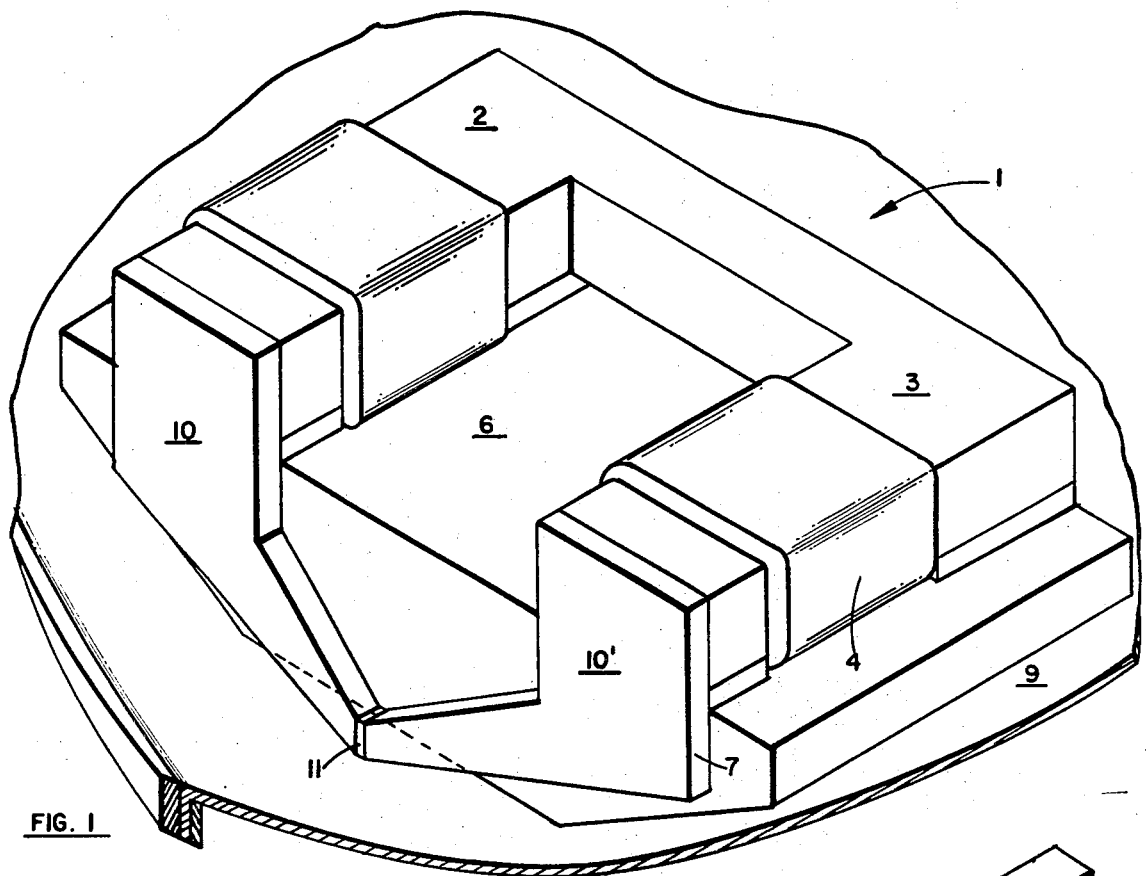
FIG. 1 illustrates a preferred embodiment of a magnetic transducer attached to a transducer support wherein the pole tips are attached at right angles to the core arms.

FIG. 1 shows magnetic core 1 comprising a rectangular shaped member having electrically insulated and separated arm members 2 and 3 interconnected at one end. Inasmuch as the other end of the rectangular shaped member is not connected, the core does not form a complete flux path. Windings 4 and 4' are disposed around the arms for inducing flux into the core and for sensing (by induced EMF) flux changes induced in the core by, for example, information comprising part of data stored on a recording track. The windings are formed from conductors which may be bobbin wound or directly wound on the arm members before the transducer is assembled.

Relatively thin portion 7, divided into sections 10 and 10', forms a pole piece for completing the magnetic circuit of the core. For the particular embodiment illustrated, the sections are attached at right angles to the ends of the arm members. Sections 10 and 10' are bonded together in the area of the recording tip 11. The bonding material may be a non-magnetic insulator in which case flux passes across the gap with the fringing flux serving for recording (or reproducing). It may also be a good electrical conductor known as an eddy current shim. Such a shim behaves like a magnetic insulator for rapidly changing flux and thus forces the useful flux to bypass the gap area in which it is located. As a result, the useful (gap fringing) recording and reproducing flux through the recording surface is increased.

Each of the sections comprising the thin portion is tapered from the areas connected to the arms of the main core to the gap for forming a recording tip having a relatively reduced height. A reduced gap height is desirable so that the flux passing between the sections is concentrated in the tip during reading and sensing. For example, a height of 0.005 inches is considered to be a reasonable design value. The thin portion may have a width of approximately 0.005 inches. The core as well as the thin portion may be comprised of a ferrite material or other magnetic materials known to persons skilled in the art.

Before the thin portion is attached to the core, the core is affixed to the top surface of transducer support member 6. The support has a height for maintaining the transducer recording tip at a desired distance from recording surface 9 during operation. Raised inserts 8, 8', 13 and 13' support the core above the top of the transducer support. Although not shown, the support is usually connected to a positioning member. In order to improve the mechanical strength of the completed transducer, particularly the thin portion, the inner surface of the sections comprising the portion may be bonded or otherwise affixed to the outer edge of the transducer support.

A transducer support of the type shown and which can be used in the present invention is described and illustrated in patent application Ser. No. 606,204 filed on Dec. 30, 1966 now abandoned for Fluid Bearing Pads for Supporting Transducers, by W. A. Farrand, et al.

A positioning member and other parts of a recording system with which the transducer may be used are described in patent application Ser. No. 394,976, now U.S. Pat. No. 3,359,549, for a Disc Memory by W. A. Farrand, et al., and for a Transducer Positioning Member Having Hydrostatic Bearing Supports, Ser. No. 607,444, now U.S. Pat. No. 3,436,994 by W. A. Farrand, et al.

Although specific examples of support, recording surfaces, positioning members, etc. are described in the referenced applications, it should be understood that application of the transducer herein described is not limited to such a system configuration.

In one process the shim of the recording tip may be produced by coating the finely finished gap surface of the pole elements with a relatively thin coating of a metal such as silver or an insulating material such as silica or glass. Thereafter, the two faces may be placed in intimate contact and furnace bonded either by actual molting of the shim material or by diffusion bonding at a temperature below the melting point. To permit high recording cell density along track, it is desirable that the recording gap be quite thin. The technique described permits control of this gap thickness in the range of a few microinches to a few milli-inches. Other more commonly used techniques, such as the use of vitreous frit (conductive or nonconductive), for fusion bonding of the two halves or the use of a vitreous melt drawn into the gap by capillary action while it is mechanically clamped in position, may also be used within the spirit of the present invention.

This pole tip configuration and assembly technique permits fabrication by a convenient method. Relatively long "sticks" of appropriate magnetic material such as ferrite are formed to a cross section corresponding to the pole element outline. These "sticks" are then bonded together as a unit (if desired, with non-magnetic fillers to provide a mechanical strut as subsequently described). The bonded unit may then be cut into slices of appropriate thickness by techniques such as are commonly used in preparing semiconductor wafers and the like. The slices so prepared may be inspected for defects and the good ones are immediately ready for final assembly to the main core and transducer support. Prior to assembling the thin portion to the core, the ends of the arm members and the surface areas of the sections to be attached to the arm members are lapped co-planar. The surfaces of the sections which are attached to the ends of the arm members comprise a large area relative to the surface area of the sections on both sides of the recording gap. As a result, the magnetic reluctance of the recording gap is large relative to the magnetic reluctance between the core and the thin portion.

Use of the stick assembly and slicing method of fabrication automatically assures lateral alignment of the pole tips, one of the critical factors in controlling transducer uniformity. It also aids in control of accuracy and uniformity of recording gap width and is of advantage in the conventional double C transducer forms as well.

During recording, the tip may be separated from recording surface 9 by a gap of 100 microinches during normal operation so that the flux affects the magnetic orientation of the material comprising the recording track. By virtue of the thin tip structure and narrow recording gap previously described, it is possible to increase both the density of computer bits (data cells) recorded on a recording tack and the density of tracks on the recording surface.

Figure 2:
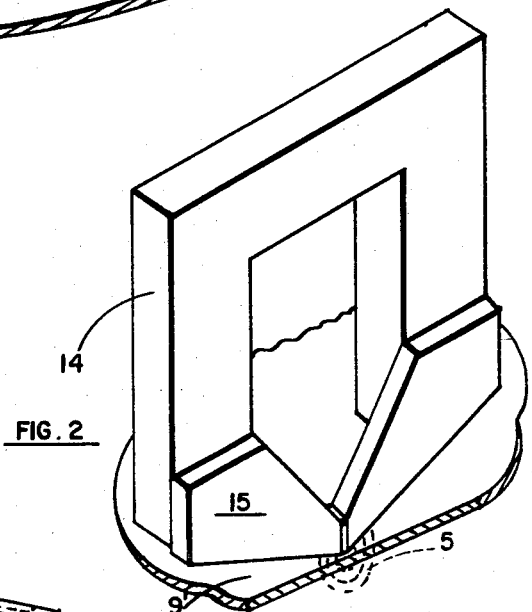
FIG. 2 illustrates a second embodiment of a magnetic transducer wherein the pole tips are attached to the side of the core arms and are essentially coplanar therewith.

FIG. 2 illustrates an alternative embodiment of the transducer core configuration. For clarity of illustration, the windings have been omitted from this figure. In this configuration the complete assembly comprises a main core member 14 and a thin pole tip portion 15 and 15' similar to the one described in FIG. 1. However, in this case the pole tip member is bonded to the side of the main core member rather than to the end. It, therefore, extends in a generally coplanar manner relative to the main core. Alternatively, the ends of the main core member might by provided with slots into which the pole member was bonded. Furthermore, it would be possible to provide oblique ends on the main core member to which the pole member would be bonded, providing a configuration bent at an angle intermediate between the cases of FIG. 1 and FIG. 2. Except for means provided for mounting these alternative configurations to a transducer support, the function of all elements shown in FIG. 2 is the same as described under FIG. 1. An exemplary flux pattern 5 is shown at the tip of the FIG. 2 embodiment passing into recording surface 9'.

Figure 3:
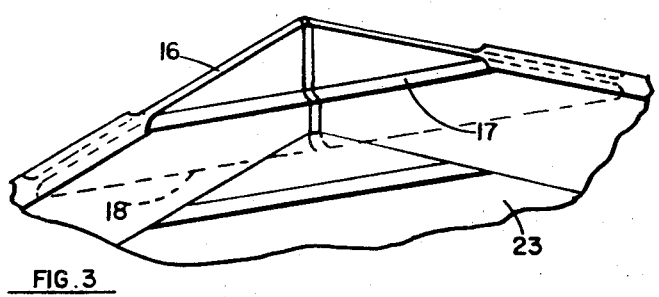
FIG. 3 illustrates the recording gap area of a modified pole tip configuration which permits a narrow recording tip to be combined with a somewhat thicker pole tip portion of the structure.

FIG. 3 illustrates a modified method for producing the recording gap portions of the pole member for either of the previously described embodiments. Herein the main structure of the pole elements may be made somewhat thicker than the required tip width for both structural strength and lower magnetic reluctance. The element is reduced to minimum thickness only in the immediate neighborhood of the recording gap as shown at 16. If this thin portion extends only as far as indicated by the solid line 17 in FIG. 3, it is essential that an eddy current shim be used in the recording gap to take full advantage of the structure. If a nonconductive shim is used, the thinning must be extended back beyond the full depth of the recording gap region as shown in the dotted lines at 18. To take full advantage of the added strength provided in the pole element by this configuration, it is desirable that a nonmagnetic strut 23 interconnected the portions of the pole tip elements. Such a strut should be of a material compatible in thermal expansion and other structural characteristics with the pole tip material. For example, if a magnetic ferrite is used for the pole tips, a nonmagnetic ferrite or other ceramic may be used to form a strut, or support.

Figure 4:
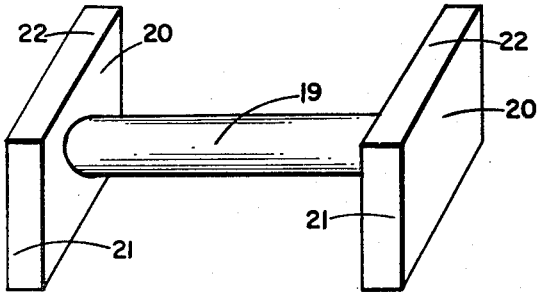
FIG. 4 illustrates an alternate configuration of the main core element.

FIG. 4 illustrates a further alternate configuration of the main core member. In this case the core is essentially straight rather than horseshoe-shaped and is configured like a conventional winding bobbin with a reduced central portion 19 and larger end portions 20 (dumbbell configuration). The enlarged end portions are of sufficient size to permit affixing the pole piece element to a flat side surface 21. By use of this configuration, the coil or coils may be wound directly on the main core element by conventional winding techniques. While not essential, it is desirable that the proportions of such a main core member provide sufficient room for the necessary winding below the level of the surface 21. Furthermore, if at least one other surface such as 22 of the enlarged ends extends beyond the winding, it may be conveniently used for attaching the main core to a transducer support.

As exemplified in the referenced applications, a transducer is connected to a support disposed over a recording surface such as a recording disc, drum, etc. The support may be stationary or movable. A signal may direct a drive means such as a motor to position the transducer at a particular recording track. In addition, a current to the winding for recording a binary one or zero at the location may be provided. A plurality of such recording stages may be made before the transducer is re-positioned. In the alternative, a signal could direct the transducer to be positioned at a recording track for the purpose of reading information previously recorded at that location. The current induced by the recorded information could be processed by the arithmetic unit or by other portions of the processing system connected to receive the information.

Although the invention has been described and illustrated in detail, it is to be understood that the same is by way of illustration and example only, and is not to be taken by way of limitation; the spirit and scope of this invention being limited only by the terms of the appended claims.

I claim:

1. A method for producing a magnetic transducer with a narrow sensing tip formed between adjacent pole faces, said method comprising the steps of, coating at least one of the pole faces with a relatively thin layer of silver, forcing the pole faces including the coating of silver together for forming a gap between the pole faces equal to the thickness of said silver coating, subjecting the pole faces and the silver coating to a temperature below the melting point of the material comprising the pole faces and the silver coating for diffusing the silver coating material and the material comprising the pole faces together thereby forming an intimate bond between the pole faces which are separated by a gap comprising the silver coating material.

* * * * *